United States Patent [19]

Uddenfeldt et al.

[11] Patent Number: 5,212,803
[45] Date of Patent: May 18, 1993

[54] METHOD FOR REDUCING EQUALIZER USAGE IN MOBILE RADIO COMMUNICATION SYSTEMS

[75] Inventors: Jan E. Uddenfeldt, Vällingby; Alex K. Raith, Kista, both of Sweden

[73] Assignee: Telefonaktiebolaget L M Ericsson, Stockholm, Sweden

[21] Appl. No.: 578,246

[22] Filed: Sep. 6, 1990

[51] Int. Cl.$^5$ .............................................. H04B 7/26
[52] U.S. Cl. .................................... 455/33.1; 375/12; 375/102; 455/34.2; 455/56.1; 455/62; 455/67.1; 455/161.3
[58] Field of Search ....................... 455/33, 34, 54, 56, 455/62, 63, 65, 67, 343, 226, 161.3, 33.1, 34.1, 34.2, 54.1, 54.2, 56.1, 67.1, 135, 277.2, 226.2; 375/11, 12, 15, 99, 100, 102; 379/59

[56] References Cited

U.S. PATENT DOCUMENTS

| | | | |
|---|---|---|---|
| 4,829,519 | 5/1989 | Scotton et al. | 455/67.3 X |
| 4,852,090 | 7/1989 | Borth | 370/104 |
| 4,903,320 | 2/1990 | Hanawa | 455/34 |
| 5,065,410 | 11/1991 | Yoshida et al. | 375/98 |

Primary Examiner—Reinhard J. Eisenzopf
Assistant Examiner—Chi H. Pham
Attorney, Agent, or Firm—Burns, Doane, Swecker & Mathis

[57] ABSTRACT

A method in a mobile radio station to select one of a number of dedicated control channels (DCCH1-21) which are transmitted from a number of base stations (B1-B21) in a mobile radio system. In the mobile station there is an equalizer to compensate for the multipath propagation characteristics of the radio medium between the mobile station and a certain base station. This equalizer is power consuming and should not be used if not necessary. According to the method an investigation is carried out in the mobile station whether or not the equalizer can be disconnected during the initialization of a call from the mobile to a base station. The signal quality of the dedicated channel (DCCH1) which has the greatest signal strength is measured without the equalizer. If the signal quality is not acceptable, a new detection is made with the use of the equalizer. If the signal quality then is acceptable another detection is made without equalizer on the dedicated control channel (DCCH2) which has the next strongest signal and if this detection revealed an acceptable signal quality the base station (B2) transmitting this control channel is selected by the mobile station for the further call progress.

17 Claims, 4 Drawing Sheets

METHOD FOR REDUCING EQUALIZER USAGE IN MOBILE RADIO COMMUNICATION SYSTEMS

FIELD OF THE INVENTION

The present invention relates to a method in a cellular mobile radio system to select a dedicated control channel when communicating between a mobile station and the base station which is associated with this selected control channel for the future communication between the base station selected and the mobile station in the cellular system. More particularly, a mobile station in the system is using the proposed method to find a base station to communicate without unnecessary use of the equalizer provided in the mobile station.

BACKGROUND OF THE INVENTION

The receiving circuit of a mobile radio apparatus normally includes a so-called equalizer which is operative to compensate for irregularities or deficiencies in the radio medium when transmitting radio signals from a base station. An equalizer is primarily used in receiving circuits for the purpose of reducing of multipath propagation in the radio medium. This is described, for instance, in WO 88/05981, which relates to a TDMA-system which includes so-called adaptive equalization. The setting of the equalizer incorporated in the radio receiver is contingent on synchronizing words that are sent simultaneously with the data words transmitted from the radio transmitter in time multiplex. With the aid of these synchronizing words, the equalizer can be set so as to equalize the dispersion properties of the medium upon receipt of the data words. Radio receivers which include equalizers are primarily used for high symbol rate communication (>100 kbit/s) the bit sensitivity of which due to multipath propagation is greater than the bit sensitivity of slower symbol rate communication.

The need for an equalizer is also determined by the nature of the surroundings, in addition to the symbol rate. The lowest multipath propagation effect is obtained, for instance, from a totally level landscape which is devoid of buildings.

The advantage of an equalizer is that it is able to equalize time dispersion in the signals received, provided that coherent detection is applied. The disadvantage of the equalizer is that it is relatively complex and has a relatively high power consumption.

The absence of an equalizer affords the advantage of enabling noncoherent demodulation to be applied, which results in a lower degree of complexity in the receiver and a lower current consumption. In addition, a robust receiver is obtained with rapidly varying radio channels, due to high vehicle speeds. The disadvantage lies in the fact that the demodulation cannot be carried out with time dispersion, which constitute a considerable part of the symbol time.

It is previously known in Swedish patent application No. 8902844-3 to connect or to disconnect the equalizer in the mobile station during a call in progression depending on the estimated time dispersion.

DISCLOSURE OF THE INVENTION

The present invention relates to a method to solve the problem of using or not using the equalizer in a mobile station before the call has been set up between the mobile station and a base station, i.e., if possible to avoid the use of the equalizer during the "sleep mode" of the mobile station.

When a mobile station is in its "sleep mode" it steadily receives signals from surrounding base stations containing "dedicated control channels" (DCCH). Such control channels are called dedicated since once a mobile has chosen one such channel it is used only by that mobile for communication with the base station and no other mobile is permitted to use the same dedicated control channel. The DCCH is transmitted across a determined frequency from a base station throughout a certain cell in the cellular system. A so-called "overhead message train" (OMT) is communicated over the dedicated control channel (DCCH) and carries information about what base station the mobile is to communicate with during the further progress of a call.

Since use of an equalizer in the mobile implies increased power consumption in the mobile it is desirable to avoid use of the equalizer not only during a call in progress but also during the set up of a call (listening, registration and paging).

An object of the present invention is to provide a method to fulfill the above mentioned desiderata, i.e. to avoid the use of the equalizer in a mobile station during the initialization of call processing between the mobile station and a base station.

According to an exemplary method according to the present invention the mobile, upon receiving set of dedicated control channels DCCH, makes an investigation as to whether a base station other than that giving the DCCH with the strongest signal can be used without using the equalizer function if the base station giving the strongest DCCH-signal requires use of the equalizer function of the equalizer function.

BRIEF DESCRIPTION OF THE DRAWINGS

The invention will now be described in more detail with reference to the accompanying drawings.

BEST MODE FOR CARRYING OUT THE INVENTION

Figure 1:
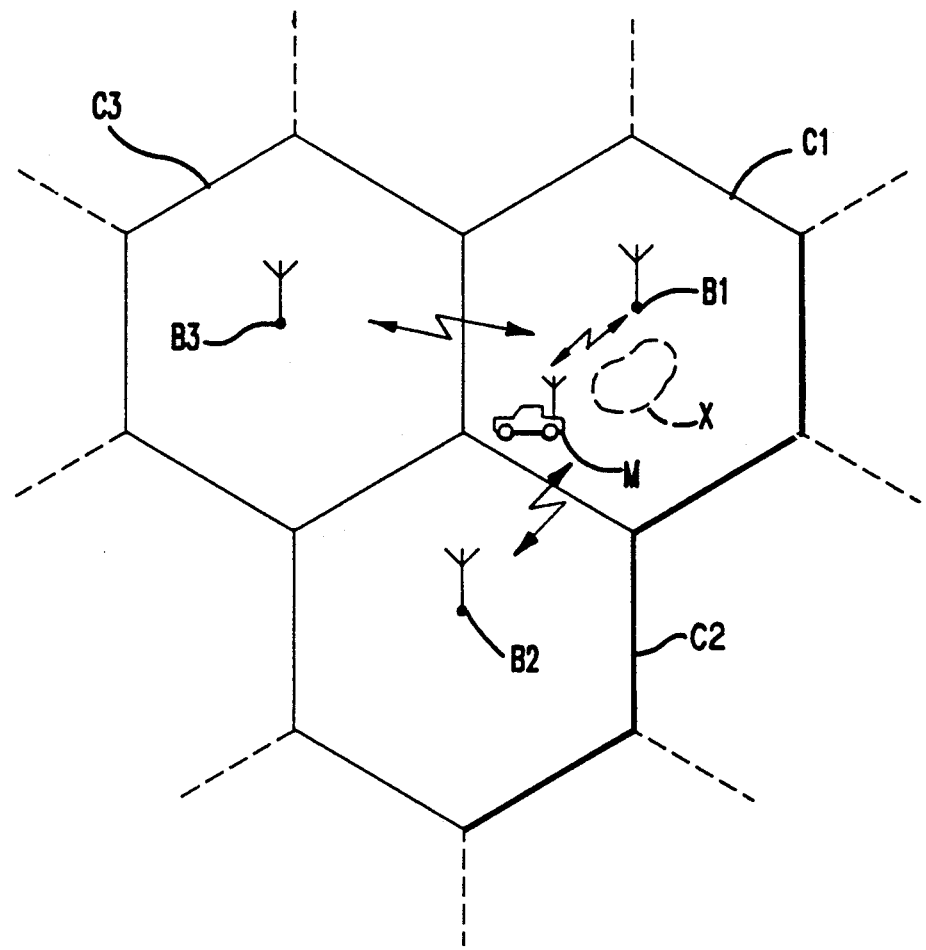
FIG. 1 illustrates a simple cell structure in a cellular mobile radio system which uses the method according to the present invention.

The inventive method is intended for a- digital mobile radio system having time division multiple access, so-called TDMA. A known digital TDMA-mobile radio system in which the invention can be applied includes a plurality of permanent base stations and a plurality of mobile radio stations capable of communicating with one another over given radio channels. FIG. 1 shows a part of such a system with three cells C1–C3 and the corresponding base stations B1–B3. A mobile station M is moving (or standing still) at some distance from the base station B1 and at some shorter distance from the border of cells C1 and C2. Mobile M has not yet set up a call, i.e., there is no call in progress in mobile M, but mobile M is in its listening mode in order to be ready to receive any call (downlink) or to set up a call (uplink). Usually a call on either an uplink or a downlink channel is to be communicated by the base station B1 which is situated nearest to the mobile M.

Figure 2:
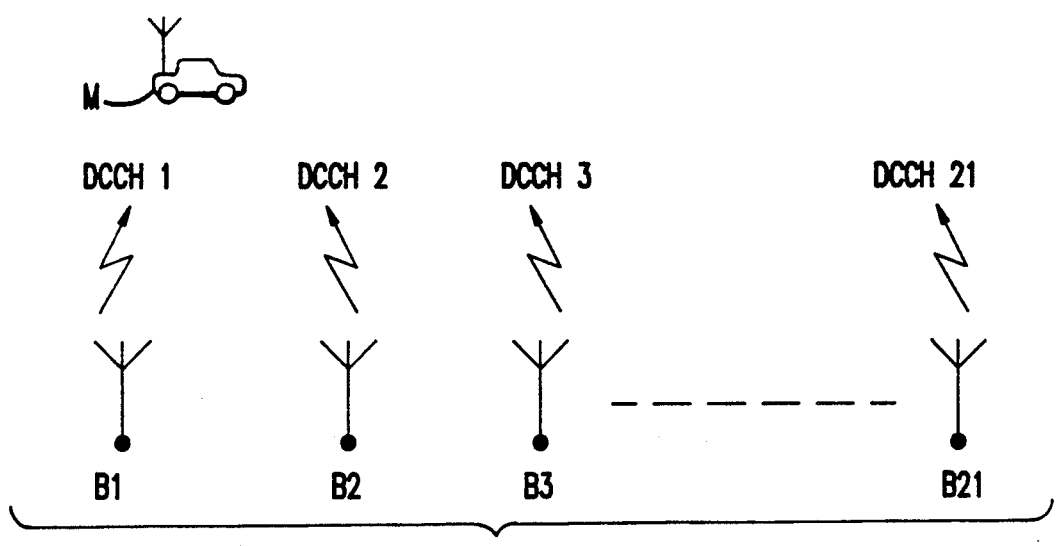
FIG. 2 shows how a plurality of dedicated control channels are transmitted in the mobile radio system.

Mobile M awaits calls by listening for a so called "overhead message" received across a dedicated control channel DCCH. There are a certain number of such control channels in the overall system each on a certain frequency. FIG. 2 shows the case where the system allocates 21 different frequencies as DCCHs and each of the base stations B1-B21 has its own frequency for its DCCH. Thus base station B1 transmits the control channel DCCH1 on frequency $f_1$, base station transmits control channel DCCH2 on frequency $f_2$ and so on. If the number of base stations is greater than 21, the frequencies $f_1$-$f_{21}$ are reused in known manner.

Figure 3:
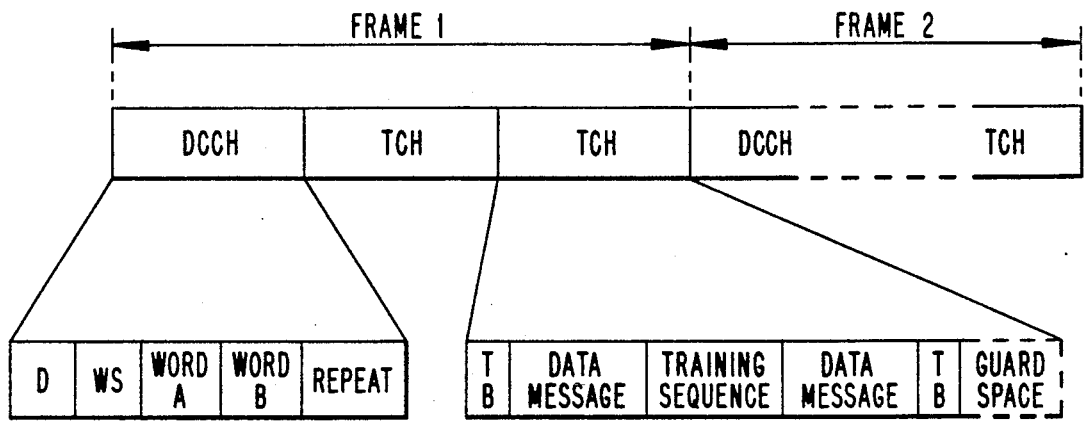
FIG. 3 illustrates the message format of a dedicated control channel and traffic channels in the mobile radio system.

FIG. 3 shows a TDMA-frame downlink format, for messages from base station to mobile station. A frame includes one slot for a dedicated control channel DCCH and two traffic channel slots. The DCCH is repeated in every frame and includes a 10-bit dotting sequence D and an 11-bit word sync sequence WS. The sequences D and WS are sent to permit mobile stations to achieve synchronization with the incoming data. Sequences D and WS are followed by Word A, Word B which are repeated five times. The signalling format of the DCCH is further described in "EIA Project Number 2215" (IS54) published by the Electronic Industry Association, Engineering Department, 2001 Eye Street, N.W. Washington DC 20006.

Before a call is set up, the dedicated control channel is used by a base station, while the traffic channels TCH in the frame are empty. Since the dedicated control channels DCCH1-DCCH21 all have different frequencies, the mobile M is able to detect all the messages transmitted over the DCCHs and radiated in the cell where mobile M is located even if the various DCCHs overlap in time. According to the above mentioned EIA-standard, mobile M enters the "Retrieve System Parameters Task" after power is applied. The mobile then is set to the preferred "System A" and after that the mobile carries out the "Scan Primary Set of Dedicated Control Channels".

As mentioned above, all the base stations in the system transmit OMTs across the dedicated control channels DCCH1-DCCH21 within their respective cell areas, but the signals sent on the DCCHs are frequently strong enough to reach neighbouring cells. Thus signals on DCCH2 and DCCH3 transmitted from base station B2 and B3 are strong enough to reach mobile M although mobile M is in the cell area C1, but near the border of cell areas C2 and C3.

In FIG. 1, suppose there is an obstacle X impeding for the radio signals transmitted from base station B1 to mobile M. This obstacle could be, for example, a populated area or a mountain. Nevertheless the strength of the signal across DCCH1 from base station B1 is stronger than the signals across DCCH2 and DCCH3 from base stations B2 and B3, respectively. But the time dispersion of the DCCH1 is higher than the time dispersion of the DCCH2. Consequently mobile M has to use its equalizer when receiving signals from the base station B1 but may not have to use the equalizer when receiving signals from base station B2. According to the present method, an investigation is carried out in the mobile M to determine whether or not it is necessary to communicate with the base station B1 giving the highest received signal strength when it is necessary to use the equalizer function for signals from this base station.

One embodiment of the inventive method will now be described with reference to the flow chart according to FIG. 4.

Figure 4:
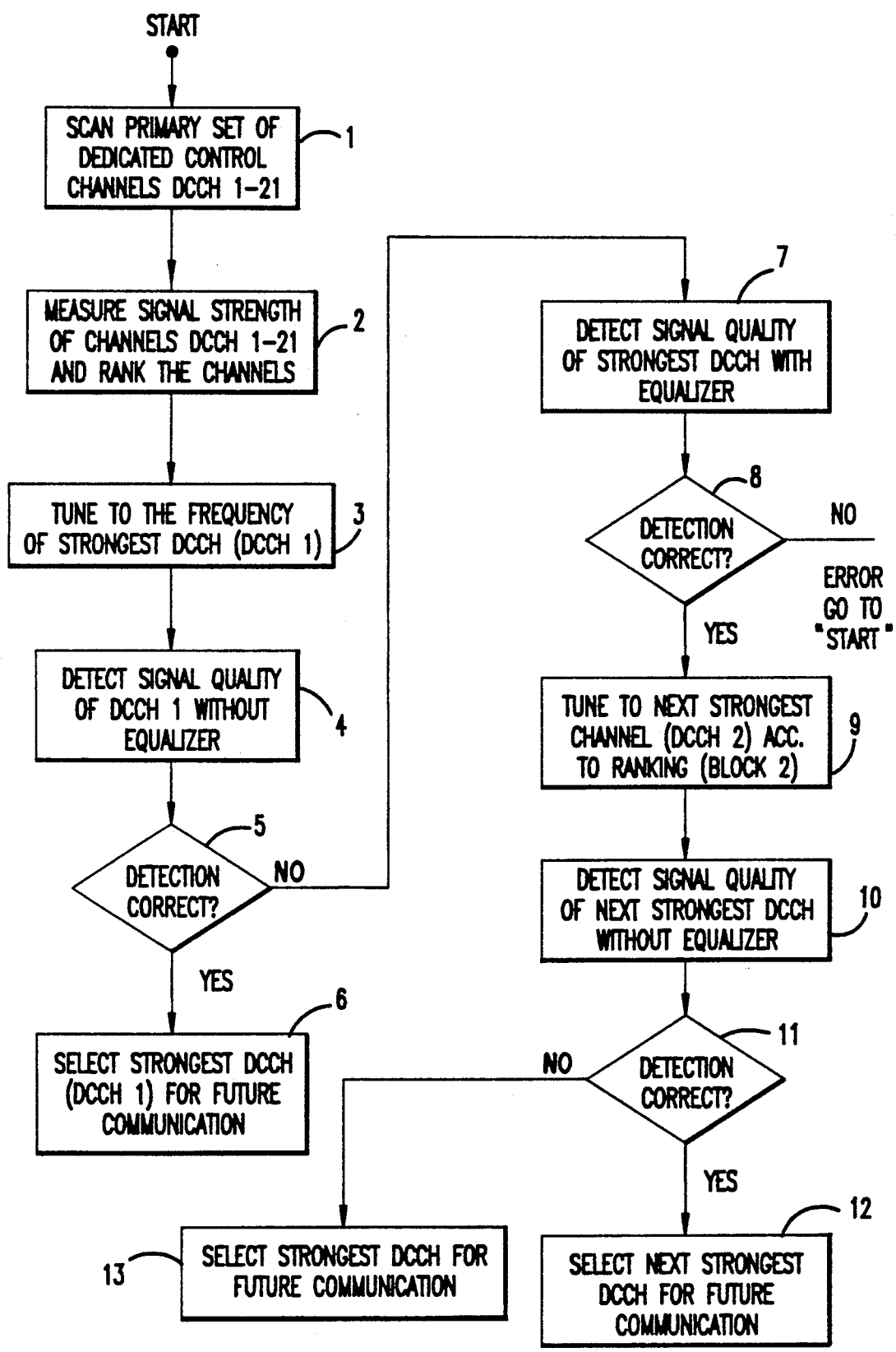
FIG. 4 shows a flow chart illustrative of a method according to one exemplary embodiment of the present invention.

When power is applied to the mobile station M the mobile station starts the initialization procedure ("Start") in FIG. 4. First the serving system parameters are retrieved and the preferred system A or B is selected. This procedure is not treated here. After that, the mobile M scans the primary set of dedicated control channels as indicated at block 1 in FIG. 4. The mobile measures the signal strength of the received dedicated channels DCCH1-21 and ranks the signal strength of these channels as shown in block 2. After this, the mobile M tunes to the frequency of the strongest DCCH at block 3. The above mentioned steps are described in the above mentioned EIA-Standard, item 2.6.1.1.2.

The signal quality of the strongest DCCH, for example DCCH1, is detected by the mobile M without use of any equalizer function to investigate whether there is a need to use this function or not at block 4. The detection of the signal quality of DCCH1 is carried out, for example by making a bit error measurement in the channel decoder in known manner as will be described in more detail in connection with FIG. 5.

If the detection was correct ("Yes") the strongest measured DCCH according to block 2 is selected since there is obviously no reason to further investigate any other DCCH without use of the equalizer function at block 6.

If the detection was not correct ("No") the signal quality of the strongest DCCH, i.e., DCCH1 must be detected with the use of the equalizer function at block 7. The investigation of "Detection correct?" according to block 8 is carried out in the same manner as according to block 5.

If the detection was not correct ("No") some error has happened and the procedure according to blocks 1-5 must be repeated. This case is not treated further but it is assumed for the following discussion that there is a correct detection ("Yes"). If the detection was correct ("Yes") the mobile is tuned to the frequency of the next strongest DCCH, for example, DCCH2, see block 9, and according to the ranking made previously (block 2).

After this, the signal quality of DCCH2 is detected at block 10, but now without any equalizer function. The detected signal is investigated by error detection in the same manner as previously described according to blocks 4 and 7.

If detection was correct, the next strongest DCCH, i.e., DCCH2, is selected for the future communication and the mobile communicates with the base station B2 without the need of an equalizer regarding registration, paging and call set up over the traffic channels TCH at Block 12.

If the detection was not correct, the mobile selects the DCCH1 with the strongest signal using the equalizer function and the future communication takes place with the base station B1 at block 13.

Figure 5:
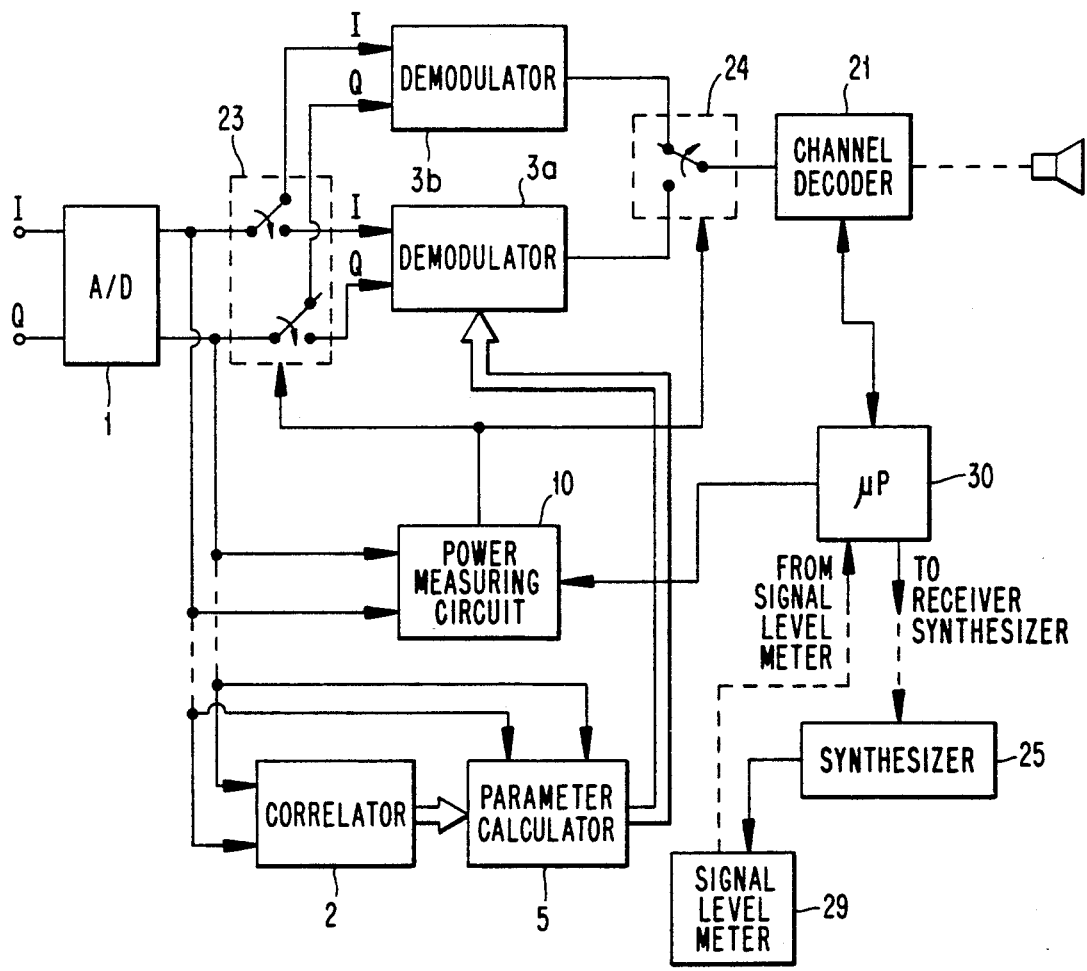
FIG. 5 shows a part of a mobile station to which the proposed method is applied.

FIG. 5 illustrates a part of the mobile receiver including the units which are involved when carrying out the present method. An analog-digital converter 1 has connected thereto two quadrature channels I and Q having modulating signals within the baseband from the radio-frequency input circuits, not shown here.

These circuits include a local oscillator, a phase shifter (90°) and a lowpass filter. Also included in the mobile are the usual RF-demodulator, receiver frequency synthesizer and signal level meter (not shown). Thus, two quadrature components within the baseband are obtained over the outputs I1 and Q1 of the analog-digital converter in sampled form (e.g., in the form of samples whose interspacing corresponds to the sampling rate). These two components are applied as one input magnitude to a correlator 2 of known design, the other input pair of which (real and complex) are connected to a memory unit (PROM) which stores in complex form the synchronizing word SW transmitted on the transmitter side. As previously mentioned, this word is transmitted within the so-called training interval. The correlator 2 thus effects correlation between the received synchronizing word SW transmitted over the radio channel and the actual synchronizing word $SW_o$ itself, the channel impulse response obtained being transmitted from the output of the correlator 2 to a parameter calculator 5. The impulse response is used for channel estimation with regard to monopath and multipath propagation and also with regard to the extent of such propagation, as explained in more detail below.

In the mobile receiver described in the above mentioned Swedish application, an evaluator is connected to the correlator 2 and functions to evaluate the otained impulse response for the burst received in the time slot of a traffic channel TCH.

Preferably, the present method is applied to another embodiment of the mobile receiver likewise described in the above mentioned Swedish application. According to this embodiment, which is shown in FIG. 5, the time dispersion of the dedicated control channel burst is evaluated by measuring a combination of the field strength received (=RSSI) and the result of bit error measurement in the channel decoder. The channel decoder 21 is able to evaluate the bit by e.g., error detecting codes of the demodulated base band signal and to provide information relating to this bit error content to the microprocessor 30 of the mobile. A decision circuit 10 measures the power of the I and Q components of the non-modulated signal.

The method can now be carried out by programming the microprocessor 30 according to the flow chart of FIG. 4.

The decision circuit 10 delivers a control signal to the two switches 23, 24 which connect demodulator 3a and disconnect demodulator 3b and vice versa to the subsequent channel decoder 21. Initially, demodulator 3a is disconnected.

When power is applied to the mobile station its microprocessor controller 30 executes the initialization procedure. First the serving system parameters are retrieved which means that the preferred system A or B is selected. This procedure as specified in the above mentioned EIA-publication is not further treated here. Depending on the choice made, the scanning of the dedicated control channels belonging to the preferred system starts at block 1 in FIG. 4.

The receiving frequency synthesizer 25 is ordered by the microprocessor 30 to generate the frequency $f_1$ which corresponds to the first dedicated control channel. When the frequency is stable, the signal level meter 29 measures the signal strength and the microprocessor 30 stores the value. The same procedure is performed for the frequencies $f_2, \ldots f_{21}$ corresponding to the remaining dedicated control channels and a ranking based on the signal strength is finally made by the microprocessor 30 at block 2. The synthesizer 25 is then ordered to tune to the frequency $f_1$ with the highest signal strength level, and the mobile will then make attempts to synchronize to this channel at block 3.

With the mobile synchronized to this channel and the equalizer function disconnected, the channel decoder 21 detects the signal quality without the equalizer function (block 4, FIG. 4) and the microprocessor 30 determines if the received DCCH 1 burst signal is acceptable or not (block 5, FIG. 4).

If the detection was not correct, microprocessor 30 sends a signal to the decision circuit 10 in order to connect the equalizer function. The decision circuit delivers a control signal to the switches 23, 24 to connect demodulator 3a and to disconnect the demodulator 3b (block , FIG. 4). At about the same time, the microprocessor 30 delivers a signal to the channel decoder 21 ordering the decoder to make a new signal detection of the DCCH1 burst. This ordering and switching can be carried out during a time interval between the two DCCH bursts in subsequent frames according to FIG. 3. Thus channel decoder detects the quality of the DCCH1-signal of one frame (frame 1) Without the equalizer function (demodulator 3b connected) and the same DCCH1-signal of the subsequent frame (frame 2) with the equalizer function (demodulator 3a connected).

If the microprocessor 30 determined that the error detected signal from the channel decoder 21 was correct, microprocessor 30 delivers an order signal to the receiver frequency synthesizer 25 of the mobile to tune to the next strongest dedicated control channel, for example, DCCH2, according to the ranking previously made (block 2). Microprocessor 30 then orders the decision circuit 10 to operate the switches 23, 24 so as to disconnect demodulator 3a and to connect demodulator 3b to the channel decoder 21. At the same time, microprocessor 30 orders demodulator 3b to be tuned to frequency $f_2$ of DCCH2 (next strongest), at block 9, FIG. 4.

The channel decoder 21 now makes a new error detection of the demodulated DCCH2-signal (without equalizer) and transmits the result to the microprocessor 30 (block 10). If the microprocessor 30 determines that the detection is correct, microprocessor 30 orders the receiving frequency synthesizer 25 to lock on this frequency $f_2$ in order so that subsequent communication is carried out on this frequency $f_2$ (block 11, FIG. 4). The mobile M will thereafter communicate with base station B2 without use of the equalizer function at block 12.

If the microprocessor 30 determined that the detection was not correct, i.e. the detected signal had a bit-error rate that was too high, microprocessor orders the receiver synthesizer 25 to tune back to frequency $f_1$ and subsequent communication takes place between the mobile and base station B1 (block 13, FIG. 4) on that frequency.

The training of the equalizer in demodulator 3a when using detection with equalizer at blocks 6 and 7 can be made by a training sequence constituted, for example, by a synchronizing word which can be available on the digital control channel.

Figure 6:
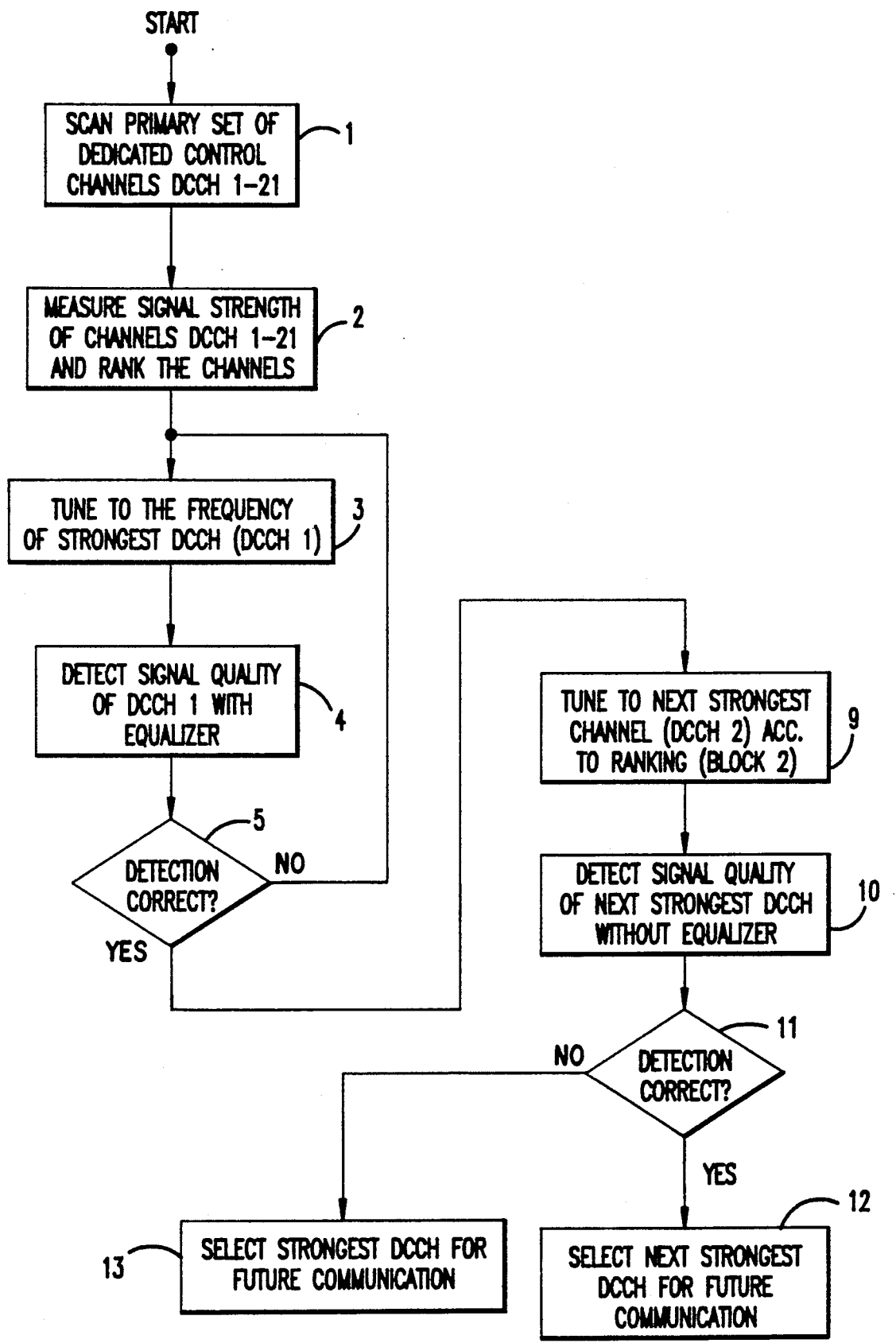
FIG. 6 shows a flow chart illustrative of another exemplary embodiment of the present invention.

Another embodiment of the inventive method is shown in FIG. 6 in which the same functional blocks as those shown in FIG. 4 have the same designations. The flow chart of FIG. 6 differs from the flow chart according to FIG. 4 in that blocks 6–8 have been omitted and the initial detection of the signal quality now is made while using the equalizer function (block 4).

Thus blocks 1–3 which are described in the EIA-standard item 2.6.1.1.2 are the same as in the flow chart according to FIG. 4. Instead of detecting the signal quality without the equalizer function as in the previous embodiment, the signal quality of the strongest DCCH, for example, DCCH1 is measured with the equalizer function at block 4. If the detection is correct ("Yes") an attempt will be made by the mobile to use another dedicated control channel, for example, the next strongest (DCCH2) but without the use of the equalizer function. Accordingly, the mobile receiver is tuned to the next strongest control channel (block 9) and the signal quality is now detected without the use of the equalizer function (block 10).

If the detection is correct ("Yes" at block 11) the next strongest control channel DCCH2 is selected, otherwise ("No") the mobile selects the strongest control channel DCCH1 (blocks 12 and 13, respectively).

The functional steps in blocks 3 and 9 are not limited to the strongest and the next strongest control channel.

The inventive method is not limited to the above described embodiments in which the dedicated control channel DCCH2 having the second strongest signal is selected when tuning the RF-receiver in the mobile station (block 9, FIGS. 4 and 6), but could be tuned instead to the third strongest signal, i.e., dedicated control channel DCCH3 from base station B3. Likewise, the procedure can continue by using a third dedicated control channel DCCH3 instead of returning to the strongest dedicated control channel DCCH1 according to block 13, FIGS. 4 and 6.

We claim:

1. In a cellular mobile radio system including a number of base stations and mobile stations, each of said mobile stations including an equalizer function which can be used for compensation of the time dispersion in the radio signals received from one of the base stations, each of said base stations transmitting a specific dedicated control channel to said mobile stations, a method of selecting one of said dedicated control channels and an associated base station, comprising the steps of:
   a) scanning a plurality of said dedicated control channels received by a mobile station,
   b) measuring the signal strength of said dedicated control channels from strongest to weakest and ranking the channels according to the signal strength thus measured,
   c) tuning the receiver of said mobile station to a first dedicated control channel having a first signal strength according to said ranking,
   d) detecting a first signal quality of said first dedicated control channel without using said equalizer function in said mobile station, and making a decision whether said first signal quality is acceptable or not,
   e) using said equalizer function in said mobile station and detecting a second signal quality of said first dedicated control channel if said first signal quality without the use of the equalizer function of said first dedicated control channel was not acceptable, and making a decision whether said second signal quality is acceptable or not,
   f) tuning the receiver to a second dedicated control channel having a second signal strength less than said first signal strength according to said ranking if said second signal quality was acceptable, and detecting a signal quality of said second dedicated control channel without using said equalizer function, and
   g) selecting said second dedicated control channel and the associated base station if the previous detection of the signal quality of said second dedicated control channel was acceptable.

2. Method as claimed in claim 1, wherein said first signal strength is the highest signal strength according to said ranking.

3. Method as claimed in claim 2, wherein said second signal strength is the next highest according to said ranking.

4. Method as claimed in claim 1, further comprising the step of selecting said first dedicated control channel if said detecting of said first signal quality was acceptable for the future communication.

5. Method as claimed in claim 1, further comprising the step of selecting said first dedicated control channel if said detection of the signal quality of said second dedicated control channel without using the equalizer function was not acceptable.

6. In a cellular mobile radio system including a number of base stations and mobile stations, each of said mobile stations including an equalizer function which can be used for compensation of the time dispersion in the radio signals received from one of the base stations, each of said base stations transmitting a specific dedicated control channel to said mobile stations in the listening mode, a method of selecting one of said dedicated control channels and an associated base stations, comprising the steps of:
   a) scanning a plurality of said dedicated control channels received by a mobile station,
   b) measuring the signal strength of said dedicated control channels and ranking the channels from strongest to weakest according to the signal strength thus measured,
   c) tuning the receiver of said mobile station to a first dedicated control channel having a first signal strength according to said ranking,
   d) detecting a first signal quality of said first dedicated control channel while using said equalizer function in said mobile station, and making a decision whether said first signal quality is acceptable or not,
   e) tuning the receiver to a second dedicated control channel having a second signal strength less than said first signal strength according to said ranking if said first signal quality was acceptable, and detecting a signal quality of said second dedicated control channel without using said equalizer function, and
   f) selecting said second dedicated control channel and the associated base station if the previous detection of said signal quality of said second dedicated control channel was acceptable.

7. Method as claimed in claim 6, wherein said first signal strength is the highest signal strength according to said ranking.

8. Method as claimed in claim 7, wherein said second signal strength is the next highest according to said ranking.

9. Method as claimed in claim 6, further comprising the step of selecting said first dedicated control channel if said detection of the signal quality of said second dedicated control channel without using the equalizer function was not acceptable.

10. A radio communication system having a plurality of remote stations and base stations comprising:

means, disposed in each of said remote stations, for detecting control signals transmitted from a plurality of base stations;

means, responsive to said detecting means, for measuring a signal strength of each of said control signals and ranking the control signals according to the measured signal strengths from strongest to weakest;

first means, responsive to said measuring means, for determining if said control signals are properly detected with equalization;

second means, responsive to said measuring means, for determining if said control signals are properly detected without equalization; and means, responsive to said first and second determining means, for selecting either a first of said control signals or a second of said control signals.

11. The system of claim 10 wherein said selecting means selects the first control signal if the first control signal is properly detected without equalization.

12. The system of claim 11 wherein said selecting means selects said second control signal if said first control signal cannot be properly detected without equalization and if said second signal is properly detected without equalization.

13. The system of claim 12 wherein said selecting means selects said first control signal if neither of said first and second control signals can be properly detected without equalization.

14. The system of claim 13 wherein said first control signal is the strongest signal in said ranking and said second control signal is the next strongest signal in said ranking.

15. The system of claim 13 wherein said first control system is the strongest signal in said ranking and said second control signal is the third strongest signal in said ranking.

16. The system of claim 10 wherein said first and second control signals comprise dedicated control channels.

17. The system of claim 10 wherein said determining means determines whether said control signals are properly detected based on a bit error rate of said control signals.

* * * * *